(12) United States Patent
Shigeeda

(10) Patent No.: US 7,439,707 B2
(45) Date of Patent: Oct. 21, 2008

(54) BATTERY, CHARGING DEVICE, AND IMAGE CAPTURE SYSTEM WITH BATTERY IDENTIFICATION MEANS

(75) Inventor: Souichirou Shigeeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 85 days.

(21) Appl. No.: 11/003,604

(22) Filed: Dec. 3, 2004

(65) Prior Publication Data

US 2005/0134223 A1 Jun. 23, 2005

(30) Foreign Application Priority Data

Dec. 9, 2003 (JP) ............................. 2003-410771

(51) Int. Cl.
*H02J 7/00* (2006.01)
(52) U.S. Cl. .................... 320/106; 320/107; 320/132; 320/134; 320/136
(58) Field of Classification Search ................ 320/106, 320/107, 132, 134, 136; 307/18–29, 43–50; 713/300–340
See application file for complete search history.

(56) References Cited

U.S. PATENT DOCUMENTS

| | | | | |
|---|---|---|---|---|
| 6,008,620 | A | * 12/1999 | Nagano et al. | ............... 320/106 |
| 6,437,536 | B2 | * 8/2002 | Higuchi | ...................... 320/106 |
| 6,509,657 | B1 | * 1/2003 | Wong et al. | .................... 307/66 |
| 6,522,361 | B2 | * 2/2003 | Higuchi et al. | ............... 348/372 |

FOREIGN PATENT DOCUMENTS

| | | |
|---|---|---|
| JP | 8-182206 A | 7/1996 |
| JP | 08-265984 A | 10/1996 |
| JP | 2001-135360 A | 5/2001 |

* cited by examiner

*Primary Examiner*—Akm Enayet Ullah
*Assistant Examiner*—Richard V Muralidar
(74) *Attorney, Agent, or Firm*—Canon U.S.A. Inc., IP Division

(57) ABSTRACT

The present invention relates to a charging technique used in a battery, a charging device, and an information-processing system. According to the present invention, for charging a secondary cell of a battery, charging the secondary cell is controlled based on identifying information output from the battery.

3 Claims, 5 Drawing Sheets

BATTERY, CHARGING DEVICE, AND IMAGE CAPTURE SYSTEM WITH BATTERY IDENTIFICATION MEANS

BACKGROUND OF THE INVENTION

1. Field of the Invention

The present invention relates generally to secondary battery cells, and more specifically to systems and methods for charging secondary battery cells.

2. Description of the Related Art

Generally, image capture systems, typified by digital cameras and video cameras, derive power from removable secondary cells.

Conventional systems for charging such secondary cells are well known. In one method, the secondary cell is charged separately from the image capture system. That is, the secondary cell is removed from the image capture system and attached to a separate charger to charge the secondary cell. In another method, the secondary cell is charged without removal from the image capture system. Here, the charging circuit and the image capture system are integrated so that the secondary cell can be charged within the image capture system.

Accordingly, the secondary cell to be charged and the charger/charging circuit should be compatible particularly when the secondary cell and the charger are integrated. That is, the charger/charging circuits are designed to use a valid battery (includes secondary cell and a computer) type. Charging a secondary cell different from a valid battery type can result in malfunction of the charger/charging circuit or a decrease in life of the secondary cell. This is indicated in, for example, Japanese Patent Laid-Open No. 8-182206. Another related art system is disclosed in Japanese Patent Laid-Open No. 2001-135360.

In particular, if the charging circuit malfunctions, the user must leave the image capture system (e.g., digital camera or video camera), in a service center for repair. Hence, the user is deprived of beneficial use and enjoyment of the image capture system while repairs are undertaken.

FIG. 5 shows a related art system for recording and reproducing an image. This system is driven by a battery 518 having a secondary cell 514 and a battery microcomputer 515 serving to identify a valid battery. The battery microcomputer 515 derives power only from the secondary cell 514. To charge the system, a system-controlling unit 508 first communicates with the battery microcomputer 515 to determine whether the battery 518 is valid. If so, a switching circuit 513 enables a charging circuit 512 to supply power to the secondary cell 514. Otherwise, power supply to the secondary cell 514 is disabled to prevent failure.

In such related art systems, the secondary cell 514 supplies power to the battery microcomputer 515. If there is insufficient power in the secondary cell 514, the battery microcomputer 515 cannot be driven, and the user cannot successfully charge the secondary cell 514 even if the battery 518 is valid.

SUMMARY OF THE INVENTION

The present invention aims to solve the above problems. An advantage of the present invention is that a battery, a charging device, and an image capture system are provided that can reliably identify a valid battery and continue charging operations even when an associated secondary cell has insufficient power.

According to an aspect of the present invention, a battery for driving a predetermined system includes a secondary cell for storing electric charge, a supply terminal for supplying power from the secondary cell to the predetermined system, a charge terminal for receiving power from a charging circuit of the predetermined system and charging the secondary cell, an electronic circuit for outputting predetermined identifying information to the predetermined system, a receive terminal for receiving power required for operating the electronic circuit from the predetermined system at least when the amount of charge in the secondary cell is insufficient to drive the electronic circuit, and a transmission terminal for transmitting to the predetermined system the identifying information output from the electronic circuit after the electronic circuit receives power from the receive terminal.

According to another aspect of the present invention, a battery for driving an image capture circuit is provided. The battery includes a secondary cell that stores electric charges to supply power to the image capture circuit. The battery also includes a charge terminal that receives power from a charging circuit of the image capture system to charge the secondary cell. The battery further includes a controller circuit that receives power from the image capture circuit to operate the controller circuit, and the controller circuit outputs identifying information about the battery to the image capture circuit. The identifying information functions to authenticate the battery to determine whether it is valid. Thus, upon receipt of power from the image capture circuit, the controller outputs the identifying information to authenticate the battery as valid. After authentication, the charge terminal receives power from the charging circuit of the image capture system to charge the secondary cell.

Further features and advantages of the present invention will become apparent from the following description of the preferred embodiments with reference to the attached drawings.

DETAILED DESCRIPTION OF THE EMBODIMENTS

The embodiments will be described with reference to the drawings.

First Embodiment

Figure 1:
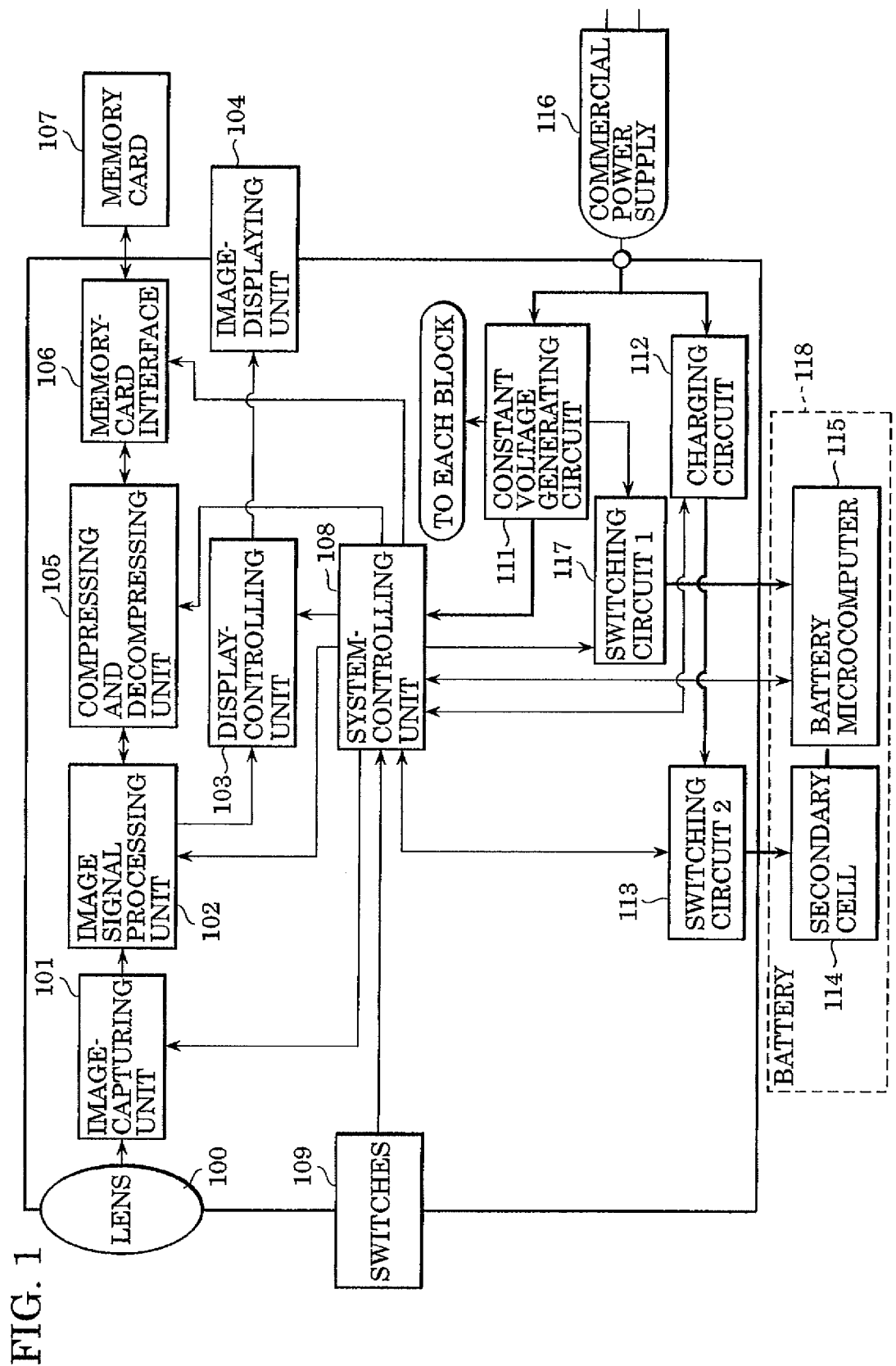
FIG. 1 is a block diagram of a typical system for recording and reproducing an image according to an embodiment of the present invention.

FIG. 1 is a block diagram of a typical system for recording and reproducing an image according to this embodiment of the present invention. A system-controlling unit 108 is a microcomputer for coordinating and executing instructions to control the entire system. An image-capturing unit 101 is a converting circuit that converts images of objects received through a lens system 100 into video signals. An image signal processing unit 102 is a circuit that performs predetermined image processing on the video signals. A display-controlling unit 103 performs display control when a signal subjected to image processing is displayed on an image-displaying unit 104. A compression and decompression unit 105 is a circuit that compresses a signal output from the image signal processing unit 102 and decompresses image data read out from a memory card 107. A memory card interface 106 is a circuit that controls reading from and writing to the memory card 107. Switches 109 include a playback switch, an image-forward switch, an image-back switch, an image-displaying key, a setting key, and a readout key.

A commercial power supply 116 supplies power to the system via an AC adapter (not shown). A constant voltage generating circuit 111 converts the voltage supplied from the commercial power supply (AC power supply) 116 to a voltage suitable for use in each unit. A charging circuit 112 controls power to be supplied to a battery 118. A second switching circuit 113 is used for enabling or disabling power supply to the battery 118 (that is, for switching supply or not supplying power to the battery 118). A secondary cell 114 stores power supplied from the system. A battery microcomputer 115 authenticates the battery 118 to the system to ensure the battery 118 is valid. A first switching circuit 117 enables or disables power supply from the constant voltage generating circuit 111 to the battery microcomputer 115 (that is, switches supplying or not supplying power to the battery microcomputer 115). Valid batteries are those that meet certain criteria and are determined to be compatible with the corresponding charger/charging circuit (e.g., batteries are genuine batteries or equivalent batteries which operate in the same way as the genuine batteries).

The battery 118 uses the secondary cell 114 to supply power to the system. Although not shown, the battery 118 includes a charge terminal for receiving power from the charging circuit 112 via the second switching circuit 113 to charge the secondary cell 114, a receive terminal for receiving power required for operating the battery microcomputer 115, and a communication terminal for communicating with the system-controlling unit 108.

Similarly, the system includes a charge terminal for supplying the secondary cell 114 with power provided from the charging circuit 112, a receive terminal for receiving power from the secondary cell 114, a power-supplying terminal for supplying power to the battery microcomputer 115, and a communication terminal for carrying out communication between the battery microcomputer 115 and the system-controlling unit 108.

Some of these terminals may be combined, physically. For example, in the battery, the charge terminal and the supply terminal may be combined; in the system, the charge terminal and the receive terminal may be combined. These terminals may be contact terminals or non-contact terminals, such as antennas or electromotive coils.

Figure 2:
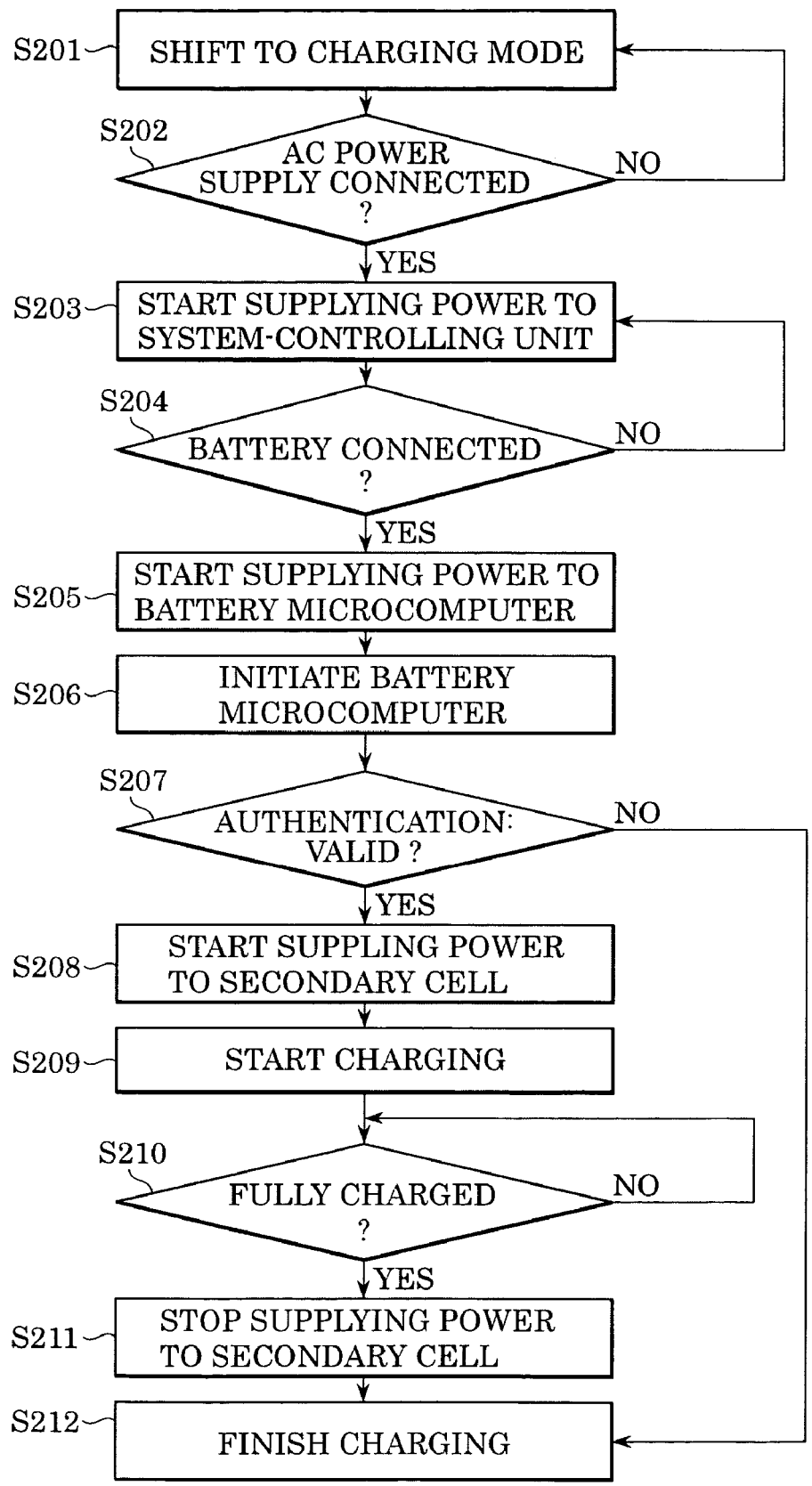
FIG. 2 is a flowchart for a charging method according to a first embodiment.

FIG. 2 illustrates a method for charging a secondary cell in accordance with an embodiment of the present invention. Specifically, in FIG. 2, the method for charging the battery 118 of FIG. 1 is described.

In step S201, the system determines if the main switch (not shown) of the switches 109 is in the OFF position. If so, the system shifts to a charging mode for charging the secondary cell 114, and the process proceeds to step S202.

In step S202, the constant voltage generating circuit 111 determines whether the system is connected to the AC power supply 116 via the AC adapter. If connection is established, the processing moves to step S203. If connection is not established, the processing goes back to step S201.

In step S203, the constant voltage generating circuit 111 starts supplying power to the system-controlling unit 108 of the system.

In step S204, the system-controlling unit 108 determines whether the battery 118 is connected to the system. This determination can be made by providing, for example, a switch for recognizing the connection on a face where the battery is in contact with the system. If the battery 118 is connected to the system, the processing moves to step S205. If not, the processing moves back to step S203.

In step S205, the system-controlling unit 108 transmits a control signal (ON signal) to the first switching circuit 117. Upon receipt of the ON signal, the first switching circuit 117 switches an internal switch so as to start supplying power to the battery microcomputer 115.

In step S206, the battery microcomputer 115 is started up and the battery microcomputer 115 then transmits a notification signal to notify the system-controlling unit 108 of the start up.

In step S207, the system-controlling unit 108 performs battery authentication between the battery microcomputer 115 and the system-controlling unit 108. For example, the system-controlling unit 108 receives a battery ID from the battery microcomputer 115 and determines whether the received ID represents a valid battery. In addition, the system-controlling unit 108 may check whether data transmitted from the battery microcomputer 115 on voltage, current, temperature, or the like of the secondary cell 114 matches data of valid batteries. Thus, valid batteries are those that meet certain criteria and are determined to be compatible with the corresponding charger/charging circuit. When the authentication determines that the battery 118 is a valid battery, the processing moves to step S208. If the battery 118 is not a valid battery, the processing moves to step S212 to terminate the charging process.

In step S208, the system-controlling unit 108 transmits a control signal (ON signal) to the second switching circuit 113. Upon receipt of the ON signal, the second switching circuit 113 switches an internal switch so as to supply power to the secondary cell 114.

In step S209, the charging circuit 112 starts charging the secondary cell 114.

In step S210, the charging circuit 112 determines whether the secondary cell 114 is fully charged. If so, the charging circuit 112 transmits a signal indicating full charge to the system-controlling unit 108, and the processing moves to step S211. If not, charging continues.

In step S211, upon receipt of the full charge signal, the system-controlling unit 108 transmits an OFF signal to the second switching circuit 113. When the second switching circuit 113 receives the OFF signal, the processing moves to step S212. The second switching circuit 113 switches the internal switch so as to cut off power from the charging circuit 112. In this manner, a system is provided for charging a secondary cell without the associated disadvantages of the related art.

As described above, according to this embodiment, an electronic circuit, such as the battery microcomputer 115, serving to determine whether a battery is a valid battery derives power directly from a charging device. As a result, even when the amount of charge in the secondary cell 114 is insufficient or the battery microcomputer 115 derives power only from an external device, the electronic circuit of the battery can be advantageously driven as soon as the electronic circuit is attached to the charging device.

Additionally, exchange of data indicating whether the battery is a valid battery between the electronic circuit, such as the battery microcomputer 115, and the charging device (e.g., the system-controlling unit 108) facilitates the determination. This reduces failure, such as a breakdown in a charging device and battery degradation, associated with charging an invalid battery.

Second Embodiment

In a second embodiment, power is not supplied to the battery microcomputer 115 during charging so that wasteful power consumption is reduced.

Figure 3:
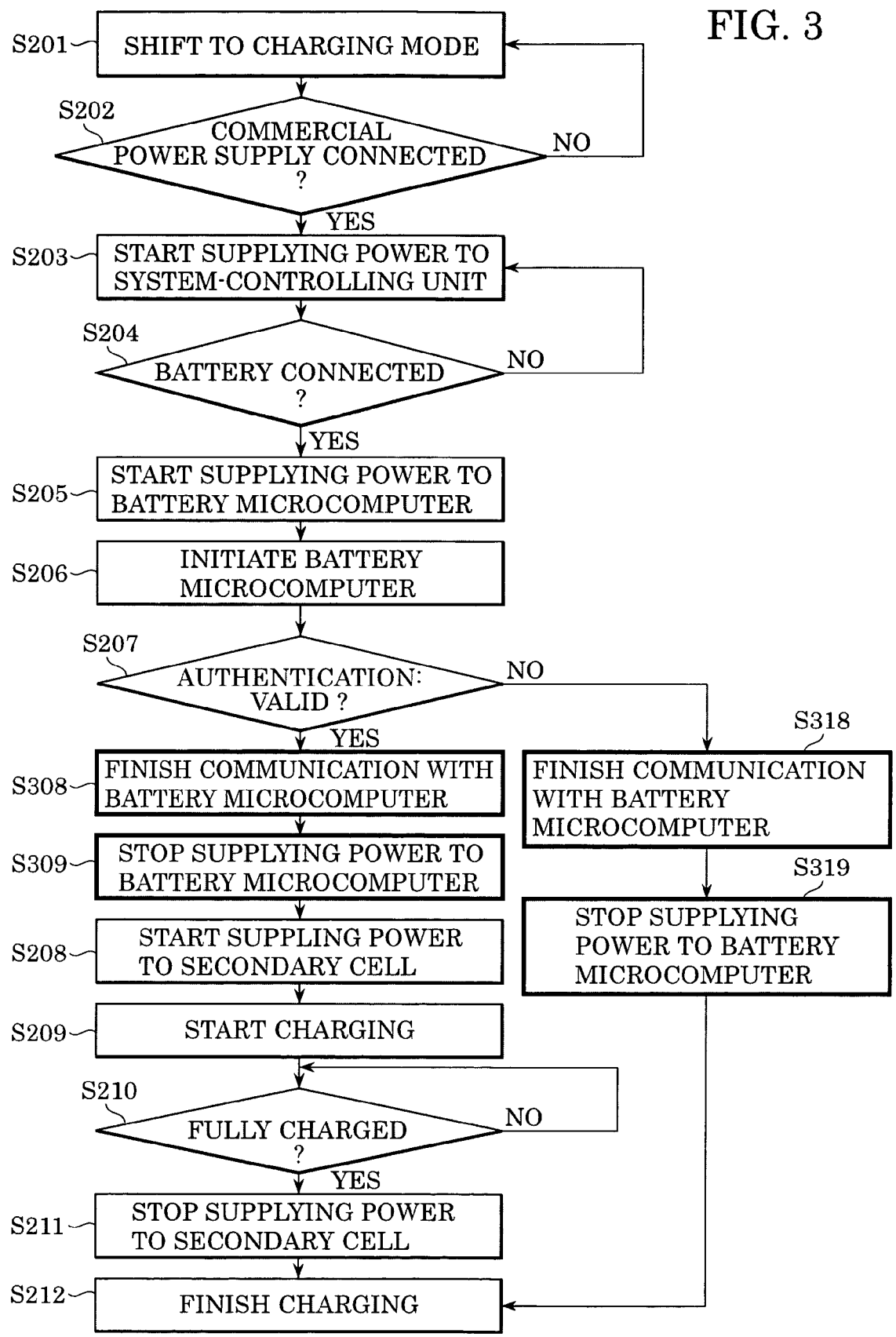
FIG. 3 is a flowchart for a charging method according to a second embodiment.

FIG. 3 is a flowchart for a charging method according to the second embodiment. In FIG. 3, the same processes as in FIG. 2 are labeled with the same reference numerals, and explanation thereof is omitted.

In step S207, which is described above, if it is determined that the battery 118 is a valid battery, the processing moves to step S308; if not, the processing moves to step S318.

In steps S308 and S318, the system-controlling unit 108 finishes communication with the battery microcomputer 115.

In steps S309 and S319, the system-controlling unit 108 transmits a control signal (OFF signal) to the first switching circuit 117. Upon receipt of the OFF signal, the first switching circuit 117 switches the internal switch so as to stop supplying power to the battery microcomputer 115. After step S309 and step S319, the processing moves to step S208 and step S212, respectively, both of which are explained above.

As described above, according to the second embodiment, in addition to the advantages of the first embodiment, wasteful power consumption is reduced since power is not supplied to the battery microcomputer 115 during charging.

Third Embodiment

In a third embodiment, for an invalid battery, a charge target setting indicating a fully charged condition is made smaller than that for a valid battery so that the danger of failures occurring when an invalid secondary cell is connected is reduced.

Figure 4:
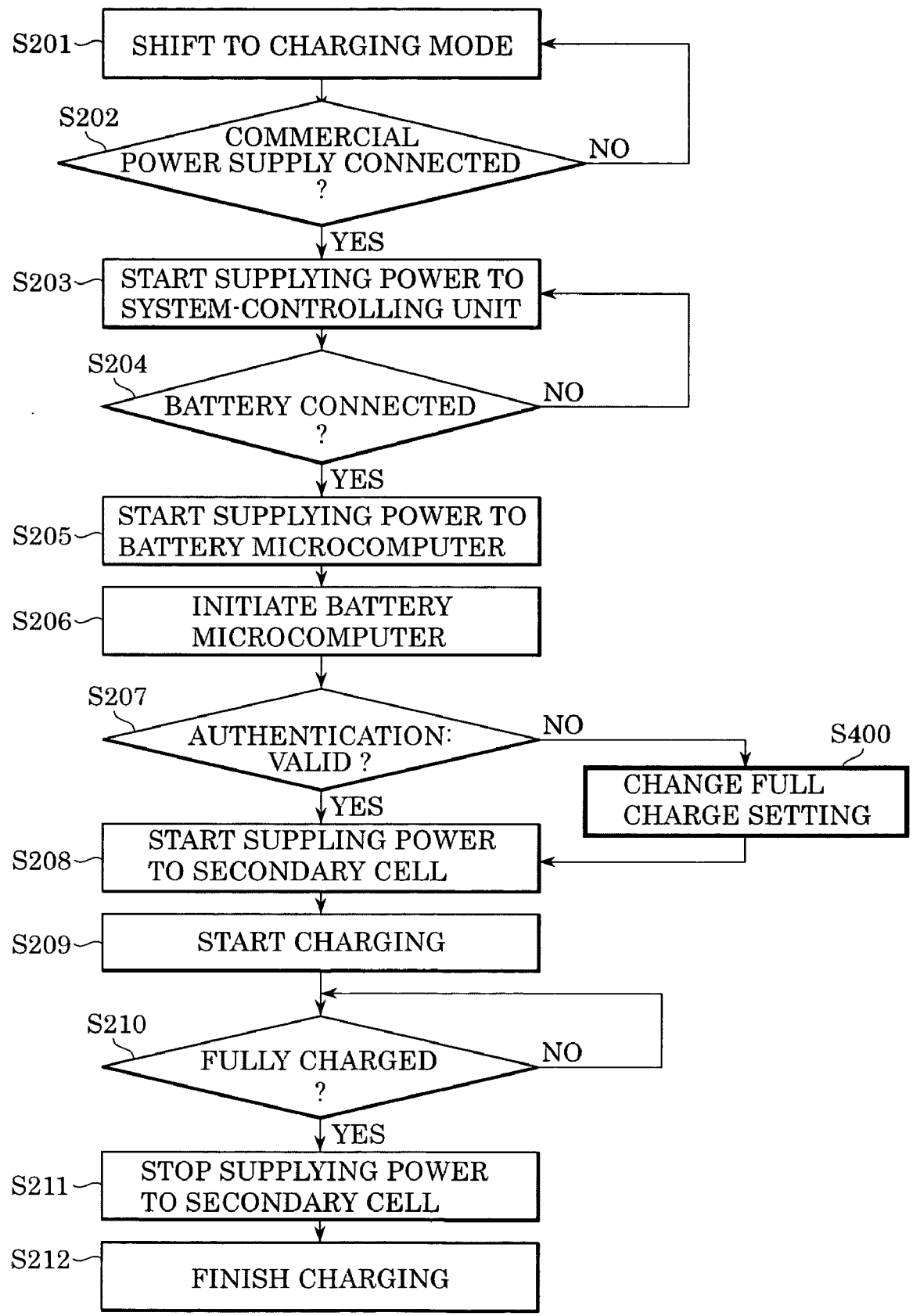
FIG. 4 is a flowchart for a charging method according to a third embodiment.
Figure 5:
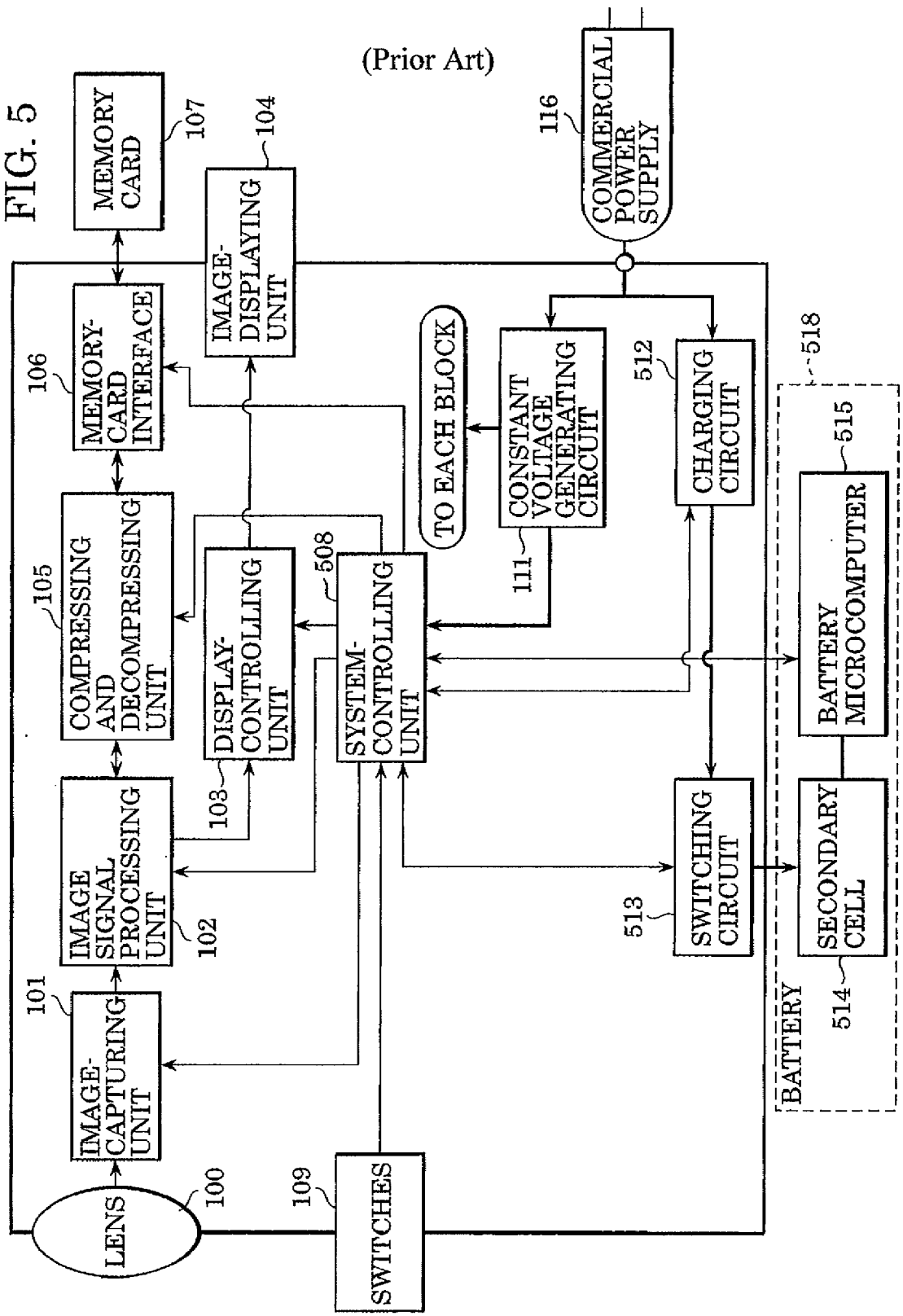
FIG. 5 illustrates a related art image capture system capable of charging a secondary battery cell.

FIG. 4 is a flowchart for a charging method according to the third embodiment. In FIG. 4, the same processes as in FIG. 2 are labeled with the same reference numerals, and explanation thereof is omitted.

In step S207, when it is determined that the battery 118 is not a valid battery, the processing moves to step S400. In step S400, the system-controlling unit 108 makes a target setting for full charge smaller than that for a valid battery. The changed setting is set in the charging circuit 112. After completing the change of the target setting, the processing moves to step S208.

Note that in the second embodiment, step S400 may be inserted right after step S319.

As described above, according to the third embodiment, for an invalid battery, a charge target setting indicating a fully charged condition is made smaller than that for a valid battery so that the danger of failures occurring when an invalid secondary cell is connected is reduced.

While the present invention has been described with reference to what are presently considered to be the embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2003-410771 filed Dec. 9, 2003, which is hereby incorporated by reference herein.

What is claimed is:

1. A charging device for charging a battery having a secondary cell and an electronic circuit outputting predetermined identifying information, the charging device comprising:

a charging circuit configured to charge the secondary cell;

a charge terminal configured to supply power for charging from the charging circuit to the secondary cell;

a power-supplying terminal, which is different from the charge terminal, configured to supply power to the electronic circuit before charging the secondary cell;

a reception terminal configured to receive the identifying information from the electronic circuit;

an instruction circuit configured to limit supply of power from the charging circuit to the charge terminal before the identifying information is received by the reception terminal;

a determination circuit configured to determine whether the identifying information received through the reception terminal is authorized identifying information; and a controller configured to control the charging circuit so as to stop charging the secondary cell in response to an amount of charge in the secondary cell having been reached at a target setting, wherein the target setting is set to a first setting when the determination circuit determines that the received identifying information is the authorized identifying information, and set to a second setting, smaller than the first setting, when the determination circuit determines that the received identifying information is not the authorized identifying information.

2. The charging device according to claim 1, further comprising:

a stop circuit configured to stop supplying power to the electronic circuit such that power is not supplied to the electronic circuit while the secondary cell is charged.

3. An image capture system drivable by at least a battery having a secondary cell and an electronic circuit outputting predetermined identifying information, the image capture system comprising:

a charging circuit configured to charge the secondary cell;

a charge terminal configured to supply power from the charging circuit to the secondary cell;

a power-supplying terminal, which is different from the charge terminal, configured to supply power to the electronic circuit before charging the secondary cell;

a reception terminal configured to receive the identifying information from the electronic circuit;

an instruction circuit configured to limit supplying power from the charging circuit to the charge terminal before the identifying information is received by the reception terminal;

a determination unit configured to determine whether the identifying information received through the reception terminal is authorized identifying information; and a controller configured to control the charging circuit so as to stop charging the secondary cell in response to an amount of charge in the secondary cell having been reached at a target setting, wherein the target setting is set to a first setting when the determination circuit determines that the received identifying information is the authorized identifying information, and the target setting is set to a second setting, which is smaller than the first setting, when the determination circuit determines that the received identifying information is not the authorized identifying information.

* * * * *